(12) United States Patent
Johnson et al.

(10) Patent No.: US 7,771,159 B2
(45) Date of Patent: Aug. 10, 2010

(54) HIGH TEMPERATURE SEALS AND HIGH TEMPERATURE SEALING SYSTEMS

(75) Inventors: Curtis Johnson, Niskayuna, NY (US); Kevin L. Bruce, Greer, SC (US); Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 664 days.

(21) Appl. No.: 11/581,250

(22) Filed: Oct. 16, 2006

(65) Prior Publication Data

US 2008/0089781 A1    Apr. 17, 2008

(51) Int. Cl.
    *F28F 7/02*    (2006.01)
(52) U.S. Cl. .................. 415/135; 277/650; 277/652; 277/654
(58) Field of Classification Search .................. 415/135, 415/136; 277/641, 650, 652, 654, 931, 943
    See application file for complete search history.

(56) References Cited

U.S. PATENT DOCUMENTS

| 3,322,433 A * | 5/1967 | Rentschler .................. 277/652 |
| 6,942,203 B2 | 11/2003 | Schroder et al. |
| 7,238,002 B2 * | 7/2007 | Cairo et al. .................. 415/119 |

* cited by examiner

*Primary Examiner*—Edward Look
*Assistant Examiner*—Dwayne J White
(74) *Attorney, Agent, or Firm*—Mark E. Henderson; Ernest G. Cusick; Frank A. Landgraff

(57) ABSTRACT

A high temperature seal that may include an interior region comprising a material that swells when exposed to a high temperature environment and at least one projection that is able to be inserted into a slot, and a coating that substantially prevents swelling to coated areas of the interior region. The coating may be disposed upon an exterior surface of the interior region such that a distal end of at least one projection remains at least partially uncoated and the remainder of the interior region is substantially covered by the coating. The interior region may include a ceramic matrix composite.

20 Claims, 5 Drawing Sheets

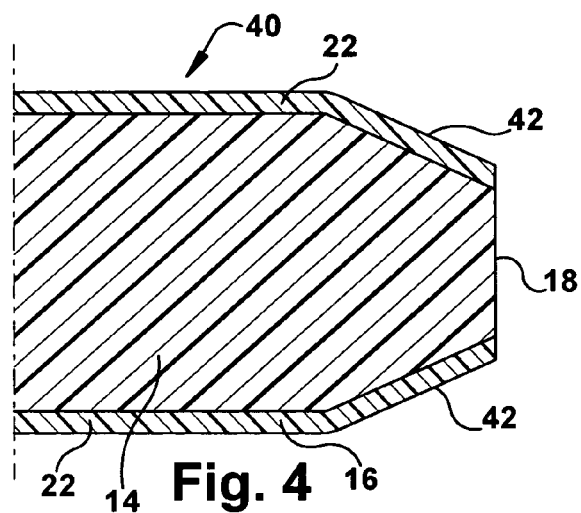
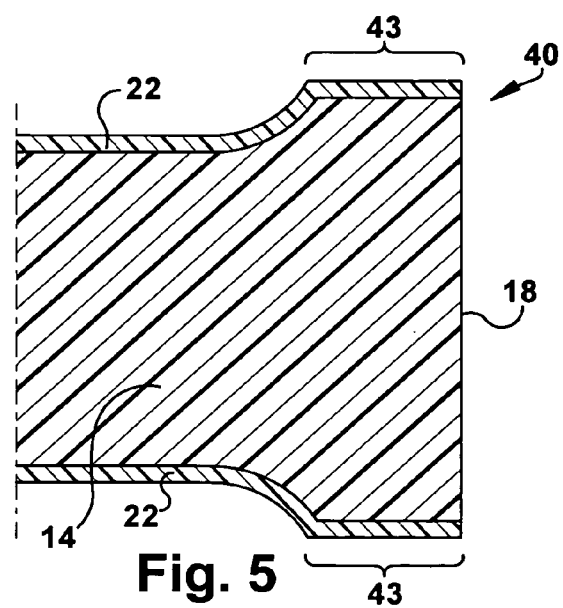
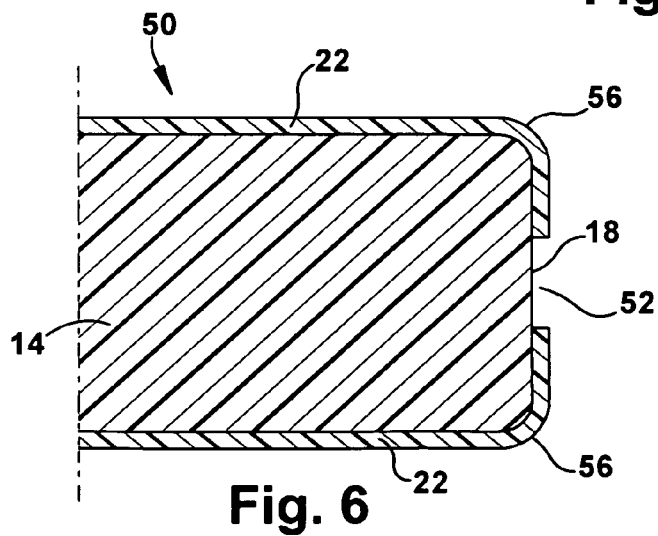

HIGH TEMPERATURE SEALS AND HIGH TEMPERATURE SEALING SYSTEMS

TECHNICAL FIELD

This present application relates generally to seals used in high temperature industrial applications. More specifically, but not by way of limitation, the present application relates to high temperature seals in turbine applications.

BACKGROUND OF THE INVENTION

High temperature seals are necessary in many industrial applications. For example, the shroud damper system of a gas or steam turbine, which is exposed to the high operating temperatures of the turbine environment, requires a damage tolerant sealing scheme that is robust against leakage and able to meet long-term durability goals. More specifically, the metal damper is used to dampen specific vibratory modes on the shroud assembly and requires a high temperature seal to prevent gas from escaping the main flowpath of the turbine and, thereby, decreasing the efficiency of the unit.

Conventional seals have proven to be unsatisfactory for such applications. For example, conventional rope seal concepts utilize a single "rope" of ceramic fibers to effect a seal against the component. However, the rope does not provide effective sealing due to its porous structure. Moreover, the chemical and mechanical degradation that occurs to the rope seal during usage further compromises the integrity of the seal such that the rope seal fails to meet long-term durability goals. Further, hot gas path temperatures in gas turbines continue to increase. As this occurs, the use of conventional, metallic seals becomes quite limited.

Accordingly, there is a need for an improved high temperature sealing system that provides an effective and robust seal against leakage while also being able to withstand a corrosive, high temperature environment, such as the environment found within the flowpath of a gas turbine. More specifically, there is a need for a high temperature sealing system that is effective in the shroud damper system of gas turbines.

BRIEF DESCRIPTION OF THE INVENTION

The present application thus describes a high temperature seal that may include an interior region comprising a material that swells when exposed to a high temperature environment and at least one projection that is able to be inserted into a slot, and a coating that substantially prevents swelling to coated areas of the interior region. The coating may be disposed upon an exterior surface of the interior region such that a distal end of at least one projection remains at least partially uncoated and the remainder of the interior region is substantially covered by the coating.

In some embodiments, the interior region may be a ceramic matrix composite. The ceramic matrix composite may be a continuous fiber ceramic matrix composite. The exposure of the uncoated region of the distal end of the projection to the high temperature environment may cause the projection to swell. The high temperature environment may be a flowpath of a gas turbine engine. In some embodiments, the coating may be an environmental barrier coating.

The interior region may include an approximate rectangular cross-section having opposing long sides and opposing short sides, each of the short sides being the distal end of the projection. In some embodiments, the opposing long sides may be at least twice as long as the short sides. In some embodiments, each of the short sides may be uncoated.

In some embodiments, at least one of the long sides may angle inward as the long side nears the short side. The angle between the long side before it angles inward and the long side after it angles inward may be between about 150 to about 170 degrees.

At least one of the short sides may be partially coated such that the uncoated region is a window in the approximate center of the short side. Exposure of the uncoated region of the window to the high temperature environment may cause the projection to swell. The window may have a predetermined size based upon the amount of swelling desired in the projection. The partially coated short side further may include rounded edges. In some embodiments, the high temperature seal, further may include a build-up of coating along the middle section of one of the long sides.

The present application further describes a high temperature-sealing system that may include: (1) a first structure with a first seal slot and a second structure with a second seal slot, the first seal slot and the second seal slot opposing each other across a sealing area; (2) a high temperature seal, the high temperature seal including an interior region with a first projection that fits within the first seal slot and a second projection that fits within the second seal slot such that, upon assembly, the high temperature seal bridges the sealing area, the interior region being made of a ceramic matrix composite that swells when exposed to a high temperature environment; and (3) a coating that substantially prevents swelling to coated areas of the interior region. The coating may be disposed upon the exterior surface of the interior region such that a distal end of the first projection and a distal end of the second projection are at least partially uncoated and the remainder of the interior region is substantially covered by the coating.

The present application further describes a high temperature sealing system for a shroud damper system in a turbine that may include: (1) a first damper block with a first seal slot and a second damper block with a second seal slot, the first seal slot and the second seal slot opposing each other across a sealing area; (2) a high temperature seal, the high temperature seal including an interior region with a first projection that fits within the first seal slot and a second projection that fits within the second seal slot such that, upon assembly, the high temperature seal bridges the sealing area, the interior region being made of a ceramic matrix composite that swells when exposed to a flow path of the gas turbine; and (3) a coating that substantially prevents swelling to coated areas of the interior region. The coating may be disposed upon the exterior surface of the interior region such that a distal end of the first projection and a distal end of the second projection are at least partially uncoated and the remainder of the interior region is substantially covered by the coating. In some embodiments, the first seal slot may be enclosed on one side by a first shroud and the second seal slot may be enclosed on one side by a second shroud.

Each of the distal ends may be partially coated such that the uncoated region is a window in the approximate center of the short side. The exposure of the uncoated region of the window to the flow path of the gas turbine may cause each of the projections to swell. The window may have a predetermined size based upon the amount of swelling desired in each of the projections.

These and other features of the present application will become apparent upon review of the following detailed

BRIEF DESCRIPTION OF THE DRAWINGS

FIG. 4 is a schematic line drawing illustrating a cross-sectional view of an alternative end of a seal in accordance with an exemplary embodiment of the present application.

FIG. 5 is a schematic line drawing illustrating a cross-sectional view of the alternative end of FIG. 4 after the seal has experienced operational swelling.

FIG. 6 is a schematic line drawing illustrating a cross-sectional view of an alternative end of a seal in accordance with an exemplary embodiment of the present application.

DETAILED DESCRIPTION OF THE INVENTION

Figure 1:
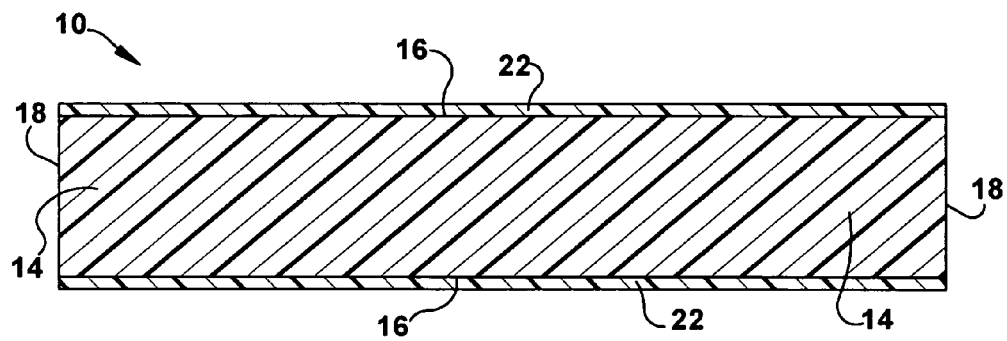
FIG. 1 is a schematic line drawing illustrating a cross-sectional view of a seal in accordance with an exemplary embodiment of the present application.

Referring now to the figures, where the various numbers represent like parts throughout the several views, FIG. 1 illustrates a cross-sectional view of a high temperature seal, which will be referred to as a CMC seal 10, according to an exemplary embodiment of the present invention. The CMC seal 10 may include an interior region 14. The interior region 14 may be comprised of a ceramic matrix composite. The ceramic matrix composite (also "CMC") for the interior region 14 may consist of a continuous fiber or a non-continuous fiber, though the continuous fiber may be preferable in a high-stress environment. In some embodiments, for example, the ceramic matrix composite may be a fiber reinforced silicon carbide/silicon carbide ceramic matrix composite. Those of ordinary skill in the art will appreciate that other ceramic matrix composites may be used.

The cross-section of the interior region 14 may be rectangular in nature, though other shapes may be used depending on the application. As illustrated, the cross-section of the interior region 14 is substantially rectangular in shape. The rectangle may have a long side 16 and a short side or end 18. The long side 16 may be significantly longer than the end 18, which, as used herein, may be defined as the long side 16 being at least twice as long as the end 18.

The interior region 14 of the CMC seal 10 may be configured such that it includes at least one projection. As used herein, a projection is a part or arm that extends away from or sticks out from the general mass or center of something. In the present case, the central area of the interior region 14 constitutes the general mass or center of something and, as one of ordinary skill in the art will appreciate, may take a multitude of forms other than the general rectangular shape that is illustrated throughout this application. The rectangular shape often may be used because of its simplicity and efficiency. In the case of the rectangular embodiment of the interior region 14, each end 18 and the section of the interior region 18 in proximity to the end 18 may constitute a projection. As discussed in more detail below, the distal end of the projection may be inserted into a slot or seal slot to complete a sealing application.

A surface of the interior region 14 may be coated with a coating 22. The coating 22 may be an environmental barrier coating. The coating 22 may consist of multiple layers, which, for example, may include a bond coat, a middle coat, and a top coat. For example, in some embodiments, the bond coat may be a silicon bond coat, the middle coat may be a mullite-barium strontium aluminosilicate ("BSAS") transition layer, and the top coat may be a BSAS top coat. Those of ordinary skill in the art will appreciate that other coatings, which may have single or multiple layers, may be used. The coating 22 may protect the interior region 14 from the conditions and high temperatures found within the flowpath of the turbine or other high temperature application. More specifically, the coating 22 may prevent the heated air in the flowpath of the turbine from reaching the CMC material. As depicted in FIG. 1, the ends 18 may remain uncoated. As discussed in more detail below, the ends 18 also may be partially uncoated. Note that in some embodiments only one end 18 may be uncoated or partially uncoated.

When exposed to gas turbine operating conditions or other high temperature application, the ceramic matrix composite of the interior region 14 may swell. More specifically, the materials of the interior region 14 go through an oxidation process, which causes the materials to swell. This oxidation process generally occurs in many high temperature industrial applications, i.e., when temperatures are above approximately 500° C. The temperatures within the flow path of a typical commercial gas or steam turbine, which generally reach 800° to 1200° C., exceed this level. The coating 22 prevents the oxidation from occurring to much of the interior region 14 by preventing the heated air from reaching the interior region 14. However, the uncoated or partially uncoated ends 18 will swell when exposed to gas turbine operating conditions or other high temperature applications.

Figure 2:
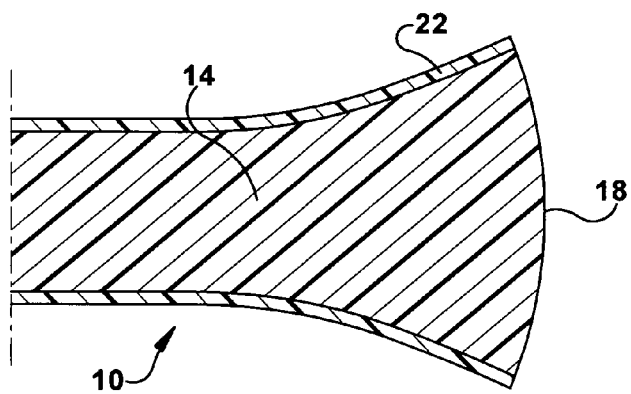
FIG. 2 is a schematic line drawing illustrating a cross-sectional view of a seal in accordance with an exemplary embodiment of the present application after the seal has experienced operational swelling.

FIG. 2 illustrates the swelling that typically occurs at an uncoated end 18 when exposed to operating conditions within a gas turbine or other high temperature application. The oxidation of the interior region 14 causes the end 18 to swell. Because the oxidation occurs at a great rate closer to the uncoated end 8, the end 18 flares outward, as shown. More specifically, the width of the interior region. 14 increases in a gradual manner along a portion of the long side 16 to a wide point at the end 18. As discussed in more detail below, it has been discovered that this known failure mechanism may be used to enhance the sealing properties and durability of high temperature seals.

Figure 3:
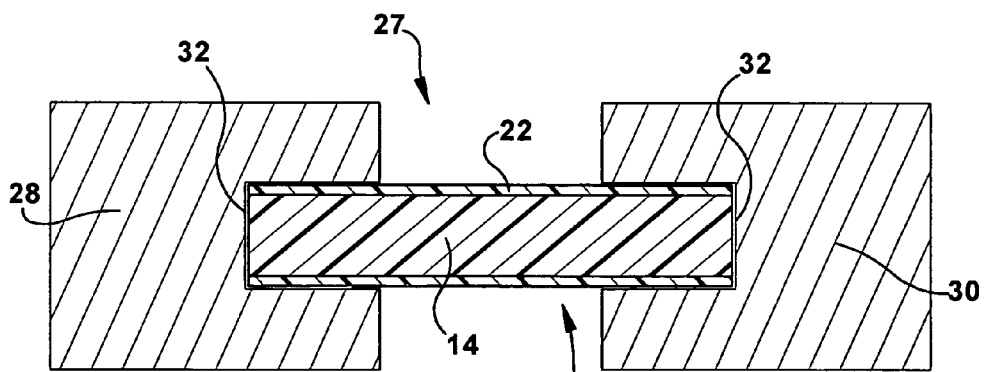
FIG. 3 is a schematic line drawing illustrating a cross-sectional view of an exemplary sealing application utilizing a seal in accordance with an exemplary embodiment of the present application.

FIG. 3 illustrates a schematic cross-sectional view of an exemplary sealing application 27 involving a first block 28 and a second block 30 within a gas turbine or other high temperature application. It may be desired that the area between the first block 28 and the second block 30 be sealed such that gas is unable to pass between the first block 28 and the second block 30. A slot or seal slot 32, thus, may be cut into each of the blocks 28, 30. The interior region 14 of the CMC seal 10 may be configured such that it includes two projections (which in this case are each end 18 and the section of the CMC seal 10 in close proximity to each of the ends 18) that may be inserted into each seal slot 32. The remainder of the CMC seal 10 may span the distance between the two blocks 28, 30.

During operation, the CMC seal 10 may become exposed to high temperature turbine exhaust gases or other high temperature conditions. The uncoated ends 18 and the section of the CMC seal 10 in close proximity to each of the ends 18 (i.e., the projections) may begin to gradually oxidize and swell. The swelling will cause each of the ends 18 to flare out and contact the inner walls of the seal slot 32 in a more firm manner, which will promote a durable and effective seal between the seal slot 32 and the end 18 and the section of the CMC seal 10 in close proximity to the end 18. In this condition, gas may be substantially prohibited from traveling around the end 18 of the seal 10 within the seal slot 32. Thus, the area between the first block 28 and the second block 30 may be sealed such that gas is substantially unable to pass therebetween.

Alternative embodiments of the present invention may enhance the sealing characteristics of the seal in certain applications. For example, as illustrated in FIG. 4, the CMC seal 40 may taper at one or both of the ends 18. More specifically, as the long side 16 nears the end 18, the long side 16 may angle inward, creating inward angled section 42 of the long side 16. The CMC seal 40 may operate similarly to the CMC seal 10 except that the configuration of the inward angled section 42 may allow for a greater length of contact area between the long side 16 and the seal slot 32 once the swelling occurs. As illustrated in FIG. 5, when the swelling occurs to the uncoated end 18, the inward angled section 42 will flare outward such that it becomes raised from and substantially parallel to the middle section of the long side 16, as opposed to the flared shape of the CMC seal 10. In this manner, the inward angle of the inward angled section 42 compensates for some of the swelling and, once the swelling has occurred, produce a greater and more even contact area within the seal slot. The contact area 43 between the long side 16 and the seal slot 32 thus will become the approximate length of the inward angled section 42, which results in an increased length of contact area (compared to that of a long side 16 that does not angle inward). The increased length of contact area between the long side 16 and the seal slot 32 may result in a more effective seal.

The configuration of the inward angled section 42 may have several beneficial effects. As described, the inward angled section 42 may compensate for the swelling such that more intimate contact and a greater length of contact between the CMC seal 40 and the seal slot 32 is achieved. Further, the seal interface may be improved. With some of the swelling compensated for, the seal contact pressure may be reduced to more acceptable levels, which may reduce wear rate and increase the longevity of the seal. Typically, the angle formed between the long side 16 before the inward angled section 42 and the inward angled section 42 may be between 150 and 170 degrees, though the angle may vary from this range depending on the application. Further, the angle formed between the long side 16 before the inward angled section 42 and the inward angled section 42 may be empirically prescribed through experiments and may be a function of coating thickness, interior region thickness, and environmental conditions. Note that the depiction of the inward angled section 42 in FIG. 4 is not to scale.

FIG. 6 illustrates another exemplary embodiment, a CMC seal 50. Instead of a completely uncoated end 18, the end 18 of CMC seal 50 may be partially coated by coating 22. The use of a partially coated end 18 may result in at least two design advantages in certain applications. First, the oxidation may be confined to the center of the interior region 14. Oxidation occurring at the edges of the interior region 14 may cause the coating 22 to become detached from the interior region 14, which may result in an increased degradation rate and a decreased operating life of the seal. Second, decreasing the surface area on the end 18 that is exposed to oxidation may allow the amount of flaring/swelling to be anticipated and, thus, controlled, which may useful in certain applications. More specifically, the area left uncoated may be increased to provided for greater swelling or decreased to provide for less, depending on the particular needs of the application. Thus, as shown in FIG. 6, the coating 22 may cover the outer edges of the end 18 and a center window 52 may be left uncovered. Also depicted in FIG. 6 are rounded edges 56. In embodiments where the coating 22 transitions from the long side 16 to partially coat the end 18, as the coating 22 does in FIG. 6, the rounded edges 56 may improve the ability to coat this area. The rounded edges may improve coating adhesion and uniformity.

Figure 7:
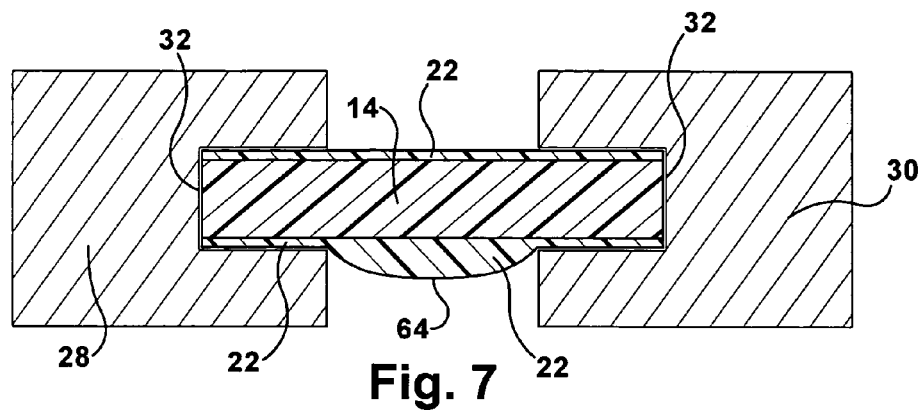
FIG. 7 is a schematic line drawing illustrating a cross-sectional view of an exemplary sealing application utilizing a seal in accordance with an alternative embodiment of the present application.

FIG. 7 illustrates another exemplary embodiment, a CMC seal 60, which is depicted within the exemplary sealing application 27 involving the first block 28 and the second block 30 within a gas turbine. As shown, the CMC seal 60 includes a coating build-up 64. The coating build-up 64 may provide for additional blockage that improves the seal. Further, the coating build-up 64 may reduce the amount of open area between first block 28 and the second block 30, which may be beneficial in some applications. The coating build-up 64 may be formed, for example, by multiple layers of coating 22.

Figure 8:
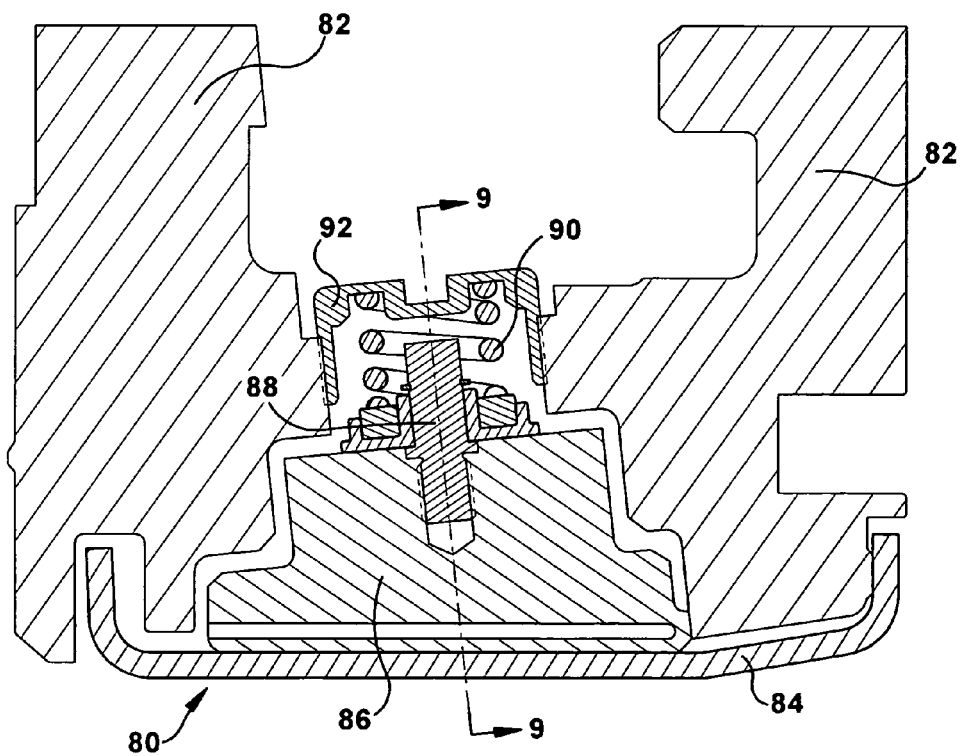
FIG. 8 is a schematic line drawing illustrating a cross-sectional view of a shroud damper system of a gas turbine utilizing a seal in accordance with an exemplary embodiment of the present application.
Figure 9:
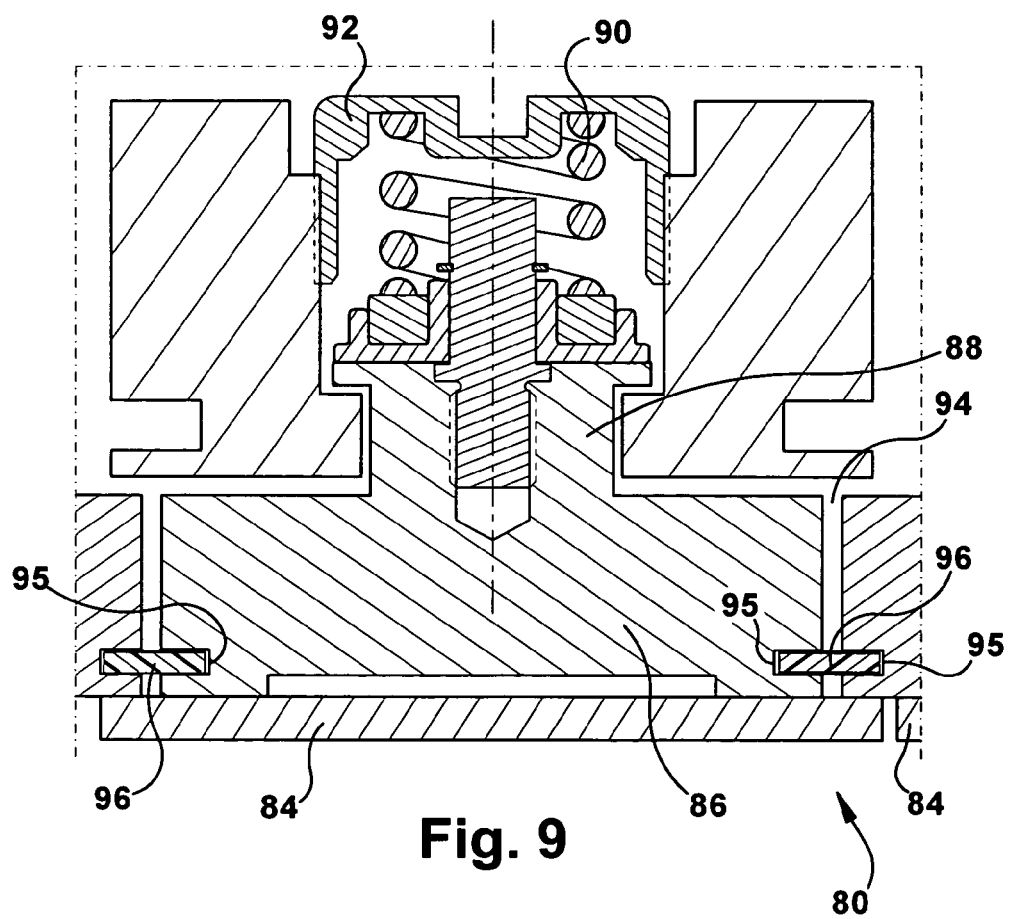
FIG. 9 is a view of the cross-sectional line 9-9 of FIG. 8.

As stated, the CMC seal 10, 40, 50, 60 may be used in high temperature applications. One application in which the CMC seal 10, 40, 50, 60 may be particularly well suited is within the shroud damper system of a gas or steam turbine. Referring now to FIGS. 8 and 9, there is illustrated an exemplary shroud damper system 80 in which the CMC seal 10, 40, 50, 60 may be used. The shroud damper system 80 described herein is more fully described in U.S. Pat. No. 6,942,203, which is incorporated herein in its entirety. Those of ordinary skill in the art will appreciate that the shroud damper system 80 is exemplary only and that the CMC seal 10, 40, 50, 60 may be used in other similar shroud damper systems.

FIG. 8 is a view in a circumferential direction and FIG. 9 is a view of the cross-sectional line 9-9 of FIG. 8. The shroud damper system 80 may include an outer shroud block or body 82 mounting a plurality of shrouds 84. It will be appreciated that a plurality of shroud blocks 82 are disposed in a circumferential array about the turbine axis and mount a plurality of shrouds 84 surrounding and forming a part of the hot gas path flowing through the gas turbine. The shrouds 84, which may be made of a ceramic composite, may be secured by bolts (not shown) to the shroud blocks 82, and may have an inner surface in contact with the hot gases of the hot gas path within the turbine.

The shroud damper system 80 may further include a damper block/shroud interface, a damper load transfer mechanism and a damping mechanism. The damper block/shroud interface may include a damper block 86 formed of a metallic material, e.g., PM2000, which is a superalloy material having high temperature use limits of up to 2200° F. As illustrated, the radially inwardly facing surface of the damper block 86 may engage a backside surface of the shroud 84. The damper load transfer mechanism may include a piston assembly having a piston 88. The radially inner end of the piston 88 may terminate in the damper block 86. The damping mechanism may include a spring 90. The spring 90 may be pre-conditioned at temperature and load prior to assembly as a means to ensure consistency in structural compliance. The spring 90 may be mounted within a cup-shaped housing formed along the backside of the shroud block 82. The spring 90 may be preloaded to engage at one end the piston 88 to bias the piston 88 radially inward. The opposite end of the spring 90 may engage a cap 92 secured, for example, by threads.

It will be appreciated by those of ordinary skill in the art that, in operation, the spring 90 of the damping mechanism may maintain a radial inwardly directed force on the piston 88 and hence on the damper block 86. The damper block 86, in turn, may bear against the backside surface of the shroud 84 to dampen vibration and particularly to avoid vibratory response at or near resonant frequencies.

To maximize the efficiency of the turbine, it is necessary to seal adjacent damper blocks 86. More specifically, if an effective seal is not present between adjacent damper blocks 86, exhaust gases will escape the main flowpath and travel around the turbine blades. As one of ordinary skill in the art will appreciate, this result is not desired because no energy is extracted from exhaust gases that do not travel over the turbine blades. Exhaust gases that escape the main flowpath decrease the efficiency of the turbine. As illustrated in FIG. 9, a circumferential space 94 may be maintained between adjacent damper blocks 86. Opposing seal slots 95 may be formed in adjacent damper blocks 86 such that a seal may be placed between the damper blocks 86 to block the circumferential space 94. The seal that is placed between the damper blocks 86 and within the opposing seal slots 95 may be the CMC seal 10, 40, 50, 60, which hereinafter, for the sake of simplicity, will be referred to as a CMC seal 96. As one skilled in the art will appreciate, the CMC seal 96 may include any of the various alternative embodiments discussed above.

Figure 10:
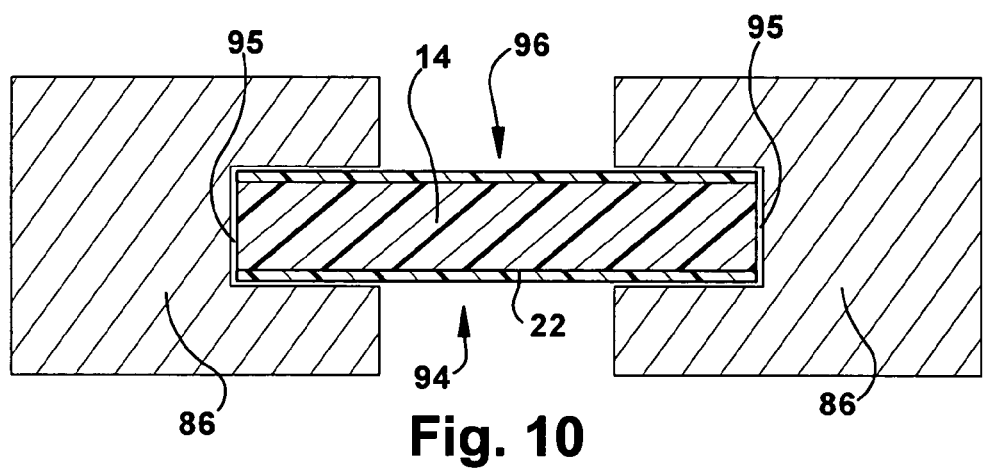
FIG. 10 is a schematic line drawing illustrating a cross-sectional view of a shroud damper system of a gas turbine utilizing a seal in accordance with an exemplary embodiment of the present application.
Figure 11:
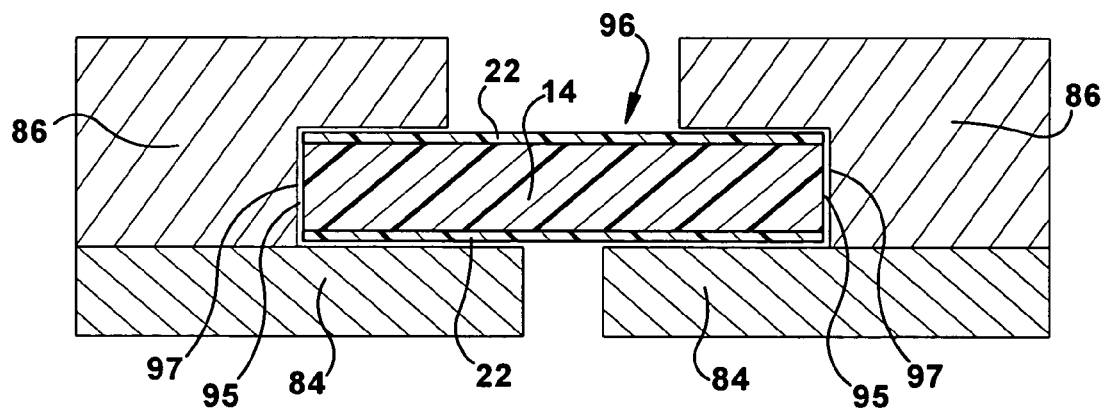
FIG. 11 is a schematic line drawing illustrating a cross-sectional view of an alternative shroud damper system of a gas turbine utilizing a seal in accordance with an exemplary embodiment of the present application.

FIGS. 10 and 11 illustrate cross-sectional views of schematic designs of the CMC seal 96 in alternative seal configurations within a shroud damper system. FIG. 10 illustrates adjacent damper blocks 86 with opposing seal slots 95 into which the CMC seal 96 may be inserted. FIG. 11 illustrates an alternative configuration in which the end 18 of the CMC seal 96 may be inserted in a seal slot 95. The seal slot 95 may be bound on a radial inward side by the abutting shroud 84. More specifically, the seal slot 95 may be created by a notch 97 cut into a radially inward quadrant of the damper block 86. The abutting shroud 84 then may be positioned such that it closes-off the radial inward side of the seal slot 95.

During operation, under either configuration, the CMC seal 96 may become exposed to high temperature turbine exhaust gases. The uncoated or partially uncoated (depending of the embodiment being used) ends 18 may begin to oxidize and swell. The swelling will cause each of the ends 18 to flare out and contact the inner walls of the seal slot 32, which will promote a durable and effective seal between the seal slot 32 and the ends 18 of the CMC seal 96. In this manner, the circumferential space 94 between adjacent damper blocks may be effectively sealed such that gas is substantially unable to pass. Those of ordinary skill will appreciate that any of the alternative embodiments discussed above for the CMC seal 96 may be used, i.e., the CMC seal 10, the CMC seal 40, the CMC seal 50 or the CMC seal 60.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A high temperature seal comprising:
   an interior region comprising a ceramic matrix composite material that swells due to oxidation when exposed to a high temperature environment of at least 500° Celsius and at least one projection that is able to be inserted into a slot; and
   an environmental barrier coating that substantially prevents the oxidation swelling to coated areas of the interior region;
   wherein the coating is disposed upon an exterior surface of the interior region such that a distal end of at least one projection is partially uncoated and the remainder of the interior region is substantially covered by the coating.

2. The high temperature seal of claim 1, wherein the interior region comprises a silicon carbide ceramic matrix composite.

3. The high temperature seal of claim 1, wherein the ceramic matrix composite comprises a continuous fiber ceramic matrix composite.

4. The high temperature seal of claim 1, wherein the exposure of the uncoated region of the distal end of the projection to the high temperature environment causes the oxidation swelling of the projection.

5. The high temperature seal of claim 1, wherein the high temperature environment comprises a flowpath of a gas turbine engine.

6. The high temperature seal of claim 1, wherein the coating comprises a multi-layered environmental barrier coating.

7. The high temperature seal of claim 1, wherein the interior region comprises an approximate rectangular cross-section having opposing long sides and opposing short sides, each of the short sides comprising the distal end of the projection.

8. The high temperature seal of claim 7, wherein the opposing long sides are at least twice as long as the short sides.

9. The high temperature seal of claim 7, wherein each of the short sides is uncoated.

10. The high temperature seal of claim 7, wherein at least one of the long sides angles inward as the long side nears the short side.

11. The high temperature seal of claim 10, wherein the angle between the long side before it angles inward and the long side after it angles inward is between about 150 to about 170 degrees.

12. The high temperature seal of claim 7, wherein at least one of the short sides is partially coated such that the uncoated region comprises a window disposed in the approximate center of the short side.

13. The high temperature seal of claim 12, wherein exposure of the uncoated region of the window to the high temperature environment causes the oxidation swelling of the projection; and
   wherein the window comprises a predetermined size based upon the amount of oxidation swelling desired in the projection.

14. The high temperature seal of claim 12, wherein the partially coated short side further comprises rounded edges.

15. The high temperature seal of claim 7, further comprising a build-up of coating along the middle section of one of the long sides.

16. A high temperature sealing system comprising:
a first structure with a first seal slot and a second structure with a second seal slot, the first seal slot and the second seal slot opposing each other across a sealing area;
a high temperature seal, the high temperature seal comprising an interior region with a first projection that fits within the first seal slot and a second projection that fits within the second seal slot such that, upon assembly, the high temperature seal bridges the sealing area, the interior region being comprised of a ceramic matrix composite that swells due to oxidation when exposed to a high temperature environment; and
an environmental barrier coating that substantially prevents the oxidation swelling to coated areas of the interior region;
wherein the environmental barrier coating is disposed upon the exterior surface of the interior region such that a distal end of the first projection and a distal end of the second projection are each partially uncoated and the remainder of the interior region is substantially covered by the environmental barrier coating.

17. A high temperature sealing system for a shroud damper system in a turbine, comprising:
a first damper block with a first seal slot and a second damper block with a second seal slot, the first seal slot and the second seal slot opposing each other across a sealing area;
a high temperature seal, the high temperature seal comprising an interior region with a first projection that fits within the first seal slot and a second projection that fits within the second seal slot such that, upon assembly, the high temperature seal bridges the sealing area, the interior region being comprised of a ceramic matrix composite that swells due to oxidation when exposed to a flow path of the gas turbine; and
an environmental barrier coating that substantially prevents the oxidation swelling to coated areas of the interior region;
wherein the environmental barrier coating is disposed upon the exterior surface of the interior region such that a distal end of the first projection and a distal end of the second projection are each partially uncoated and the remainder of the interior region is substantially covered by the environmental barrier coating.

18. The high temperature sealing system for a shroud damper system in a turbine of claim 17, wherein the first seal slot is enclosed on one side by a first shroud and the second seal slot is enclosed on one side by a second shroud.

19. The high temperature sealing system for a shroud damper system in a turbine of claim 17, wherein each of the distal ends is partially coated such that the uncoated region comprises a window in the approximate center of the short side.

20. The high temperature sealing system for a shroud damper system in a turbine of claim 19, wherein the exposure of the uncoated region of the window to the flow path of the gas turbine causes the oxidation swelling of the projection; and
wherein the window comprises a predetermined size based upon the amount of oxidation swelling desired in each of the projections.

* * * * *